United States Patent
Naccache

(10) Patent No.: US 8,171,456 B2
(45) Date of Patent: May 1, 2012

(54) METHOD FOR AUDITING COMPLIANCE OF AN ELECTRONIC PLATFORM AND/OR A COMPUTER PROGRAM PRESENT ON SAID PLATFORM, AND DEVICE AND COMPUTER PROGRAM CORRESPONDING THERETO

(75) Inventor: David Naccache, Paris (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 1165 days.

(21) Appl. No.: 11/962,407

(22) Filed: Dec. 21, 2007

(65) Prior Publication Data

US 2008/0155507 A1 Jun. 26, 2008

(30) Foreign Application Priority Data

Dec. 22, 2006 (FR) ..................................... 06 11348

(51) Int. Cl.
- *G06F 9/44* (2006.01)
- *G01R 19/00* (2006.01)
- *G01R 31/00* (2006.01)
- *H04L 9/32* (2006.01)

(52) U.S. Cl. ........ 717/124; 702/189; 713/172; 713/185; 324/762.01

(58) Field of Classification Search .................. None
See application file for complete search history.

(56) References Cited

U.S. PATENT DOCUMENTS

| | | | | |
|---|---|---|---|---|
| 5,206,938 A | * | 4/1993 | Fujioka | 711/200 |
| 5,416,423 A | * | 5/1995 | De Borde | 324/677 |
| 5,570,012 A | * | 10/1996 | Orense | 324/762.01 |
| 6,412,104 B1 | * | 6/2002 | Tseng | 717/124 |
| 6,725,449 B1 | * | 4/2004 | Maeda et al. | 717/124 |
| 6,981,188 B2 | * | 12/2005 | Galzur et al. | 714/719 |
| 7,062,754 B2 | * | 6/2006 | Chang | 717/124 |
| 7,069,437 B2 | * | 6/2006 | Williams | 713/166 |
| 7,085,980 B2 | * | 8/2006 | Martin-de-Nicolas et al. | 714/736 |

(Continued)

FOREIGN PATENT DOCUMENTS

DE 100 41 669 2/2002

(Continued)

OTHER PUBLICATIONS

Lazic, D. et al., One-Trial Electromagnetic Attack on Modular Exponentiation, Proceedings of the 5th International ITG Conference on Source and Channel Coding (SCC), Jan. 14-16, 2004, [retrieved on Jan. 20, 2012], Retrieved from the Internet: <URL: http://citeseerx.ist.psu.edu/index>.*

(Continued)

*Primary Examiner* — Tuan Dam
*Assistant Examiner* — Geoffrey St Leger
(74) *Attorney, Agent, or Firm* — David D. Brush; Westman, Champlin & Kelly, P.A.

(57) ABSTRACT

A method is provided for auditing compliance of an electronic platform, referred to as the platform being tested, and/or a computer program being tested, which is present on the platform being tested. The method includes the following steps: transmitting the same data set, via an auditing device, to the platform being tested, on the one hand, and, on the other hand, to a compliant reference platform present in the auditing device; and deciding upon the compliance of the platform being tested and/or the computer program being tested, based on an analysis of the respective behaviors of the platform being tested and the reference platform. The auditing device then issues a compliance decision.

21 Claims, 4 Drawing Sheets

U.S. PATENT DOCUMENTS

| | | | |
|---|---|---|---|
| 7,171,565 B1 * | 1/2007 | Martens et al. | 713/185 |
| 7,330,024 B2 * | 2/2008 | Hashimoto | 324/762.01 |
| 7,454,318 B2 * | 11/2008 | Baker | 702/189 |
| 7,877,659 B2 * | 1/2011 | Geller et al. | 714/741 |
| 2002/0093358 A1 * | 7/2002 | Kang | 324/765 |
| 2003/0005331 A1 * | 1/2003 | Williams | 713/201 |
| 2003/0037295 A1 * | 2/2003 | Galzur et al. | 714/719 |
| 2003/0208710 A1 * | 11/2003 | Martin-de-Nicolas et al. | 714/736 |
| 2005/0213755 A1 | 9/2005 | Daniels et al. | 380/38 |
| 2006/0072273 A1 * | 4/2006 | Hashimoto | 361/93.1 |
| 2007/0083351 A1 * | 4/2007 | Van Assche et al. | 703/14 |
| 2008/0040607 A1 * | 2/2008 | Kaabouch et al. | 713/172 |
| 2008/0115027 A1 * | 5/2008 | Geller et al. | 714/738 |

FOREIGN PATENT DOCUMENTS

| | | |
|---|---|---|
| EP | 1 653 321 | 5/2006 |
| WO | WO 99/09521 | 2/1999 |
| WO | WO 00/17826 | 3/2000 |
| WO | WO 2004/113940 | 12/2004 |

OTHER PUBLICATIONS

Gammel, B. et al., Smart Cards Inside, Proceedings of 35th European Solid-State Device Research Conference, 2005, Sep. 12-16, 2005, pp. 69-74, [retrieved on Jan. 23, 2012], Retrieved from the Internet: <URL:http://ieeexplore.ieee.org/>.*

French Search Report from counterpart foreign Application No. FR 06/11348.

* cited by examiner

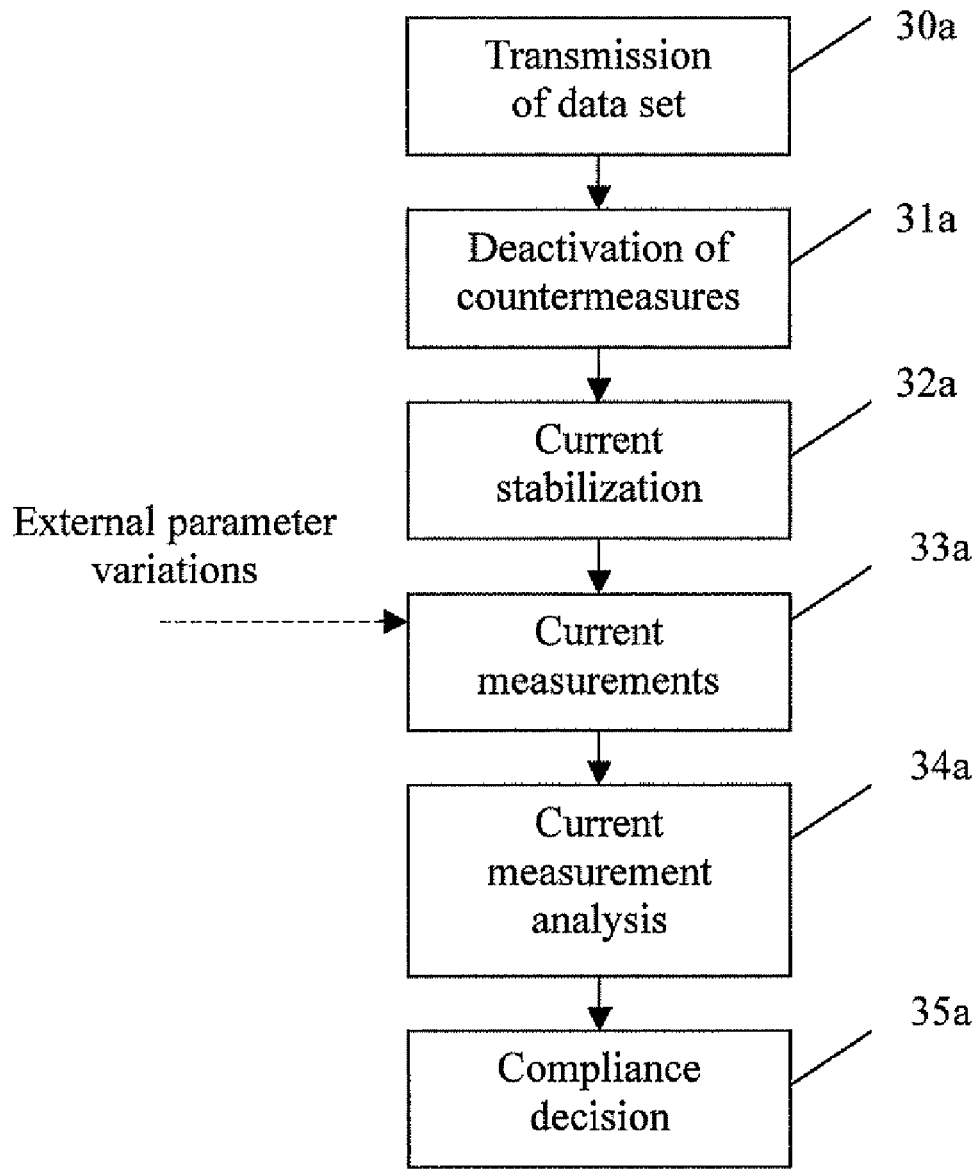

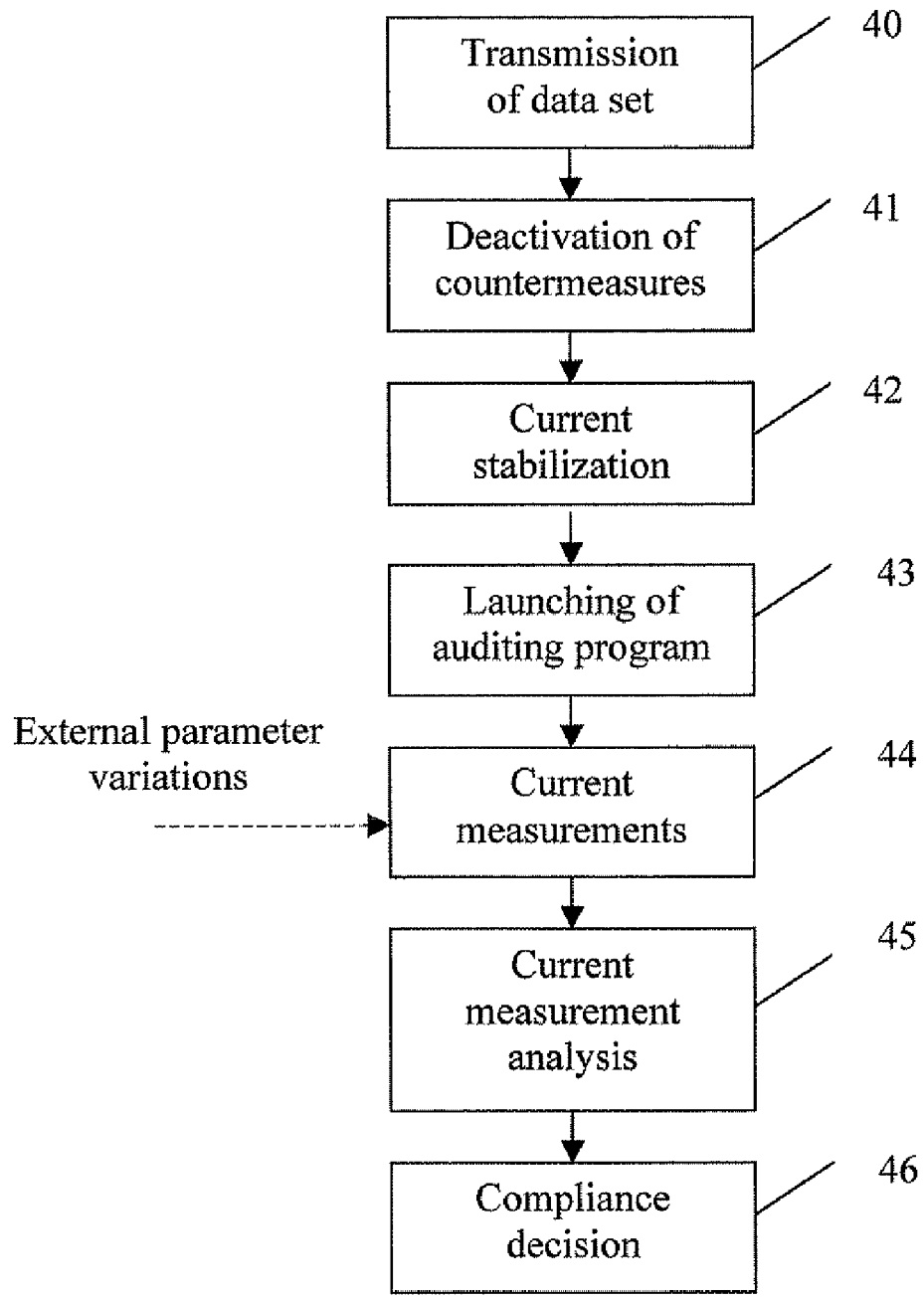

METHOD FOR AUDITING COMPLIANCE OF AN ELECTRONIC PLATFORM AND/OR A COMPUTER PROGRAM PRESENT ON SAID PLATFORM, AND DEVICE AND COMPUTER PROGRAM CORRESPONDING THERETO

CROSS-REFERENCE TO RELATED APPLICATION

None.

FIELD OF THE DISCLOSURE

The field of the disclosure is that of preventing counterfeiting of secure microprocessor objects, hereinafter referred to as an electronic platform or chip, and/or programs intended to be integrated into such chip objects.

The disclosure relates more particularly to the detection of fraud, attempted fraud or another illegal action by means of chip objects which are copied, imitated or cloned, or which carry a non-authentic program, e.g., malicious (virus, Trojan horse, etc.).

The invention applies in particular to smart cards. Such smart cards are thus substantially described herein below, but the disclosure can be easily implemented for any type of object, in particular a portable object provided with such a chip, regardless of the nature thereof.

BACKGROUND OF THE DISCLOSURE

1. Smart Cards

Smart cards have been used for a long time, in particular in order to identify or authenticate a product, an account and/or a person. The chip, or microprocessor, thus has a specific transistor structure defining a processing logic, and memory areas, a least a portion of which is secure and which contains secret data.

2. Detection of Cloned Cards

A smart card, which is used, for example, as a means of payment, thus comprises an electronic circuit called a chip, in which the logical behavior of the card is programmed, i.e., responses to the various prompts that it may receive. An electronic circuit such as this can in particular comprise standard electronic components (transistors, operational amplifiers), complex components (microprocessors, storage devices) and digital components (logic gates) combined together via a component creation software package, in order to carry out the operations for which the card is designed.

Methods exist for detecting non-compliant smart cards, which are based on auditing the logical behavior of the card being tested.

These methods make it possible to verify whether the programmed behavior of the card is correct. However they do not enable detection of a cloned card.

In fact, if it has been effectively programmed, a cloned smart card has the same logical behavior as a "legitimate" smart card (i.e., marketed by authorized smart card manufacturers). It differs therefore by its design, but not by its behavior, since it does not comprise the same electronic circuit.

It is actually very difficult for a counterfeiter to obtain legitimate electronic circuits, the distribution thereof being reserved for card manufacturers. However, a counterfeiter who has extracted information from a legitimate card enabling him to reproduce the logical behavior thereof can program an electronic circuit purchased off-the-shelf in order to produce a cloned card.

A cloned card such as this is difficult to distinguish from a legitimate card, the logical behaviors thereof being identical. They differ solely by the "jungle" of transistors, which comprise them. However, these "jungles" are not easy to analyse, on the one hand because they are uninterpretable (it is a question of the result of electronic data processing the aspect of which is random), and, on the other hand, because comparison would require destruction of the cards and the use of costly means such as electron microscopes.

Thus, it is currently possible to control the logical behavior of a smart card, but, to date, no effective detection method exists which is capable of detecting cloned smart cards, which have the same logical behavior but different components.

3. Detection of a Malicious Program

Smart cards also exist the program of which is counterfeited so as to cause the card to behave in a particular way in response to a predefined prompt from a fraudster (e.g., to conduct an unauthorized transaction or to access protected data, subsequently enabling cloned cards to be produced).

Such programs, referred to as corrupted or malicious programs, can prove to be undetectable by a conventional method for detecting the logical behavior of a card.

In fact, the malicious behavior of such programs is often triggered by a particular prompt (e.g., a long and meaningless binary sequence with regard to the "normal" program) which cannot be detected under the time and resource related conditions available to existing detection methods, but which can result in a specific behavior that has been preprogrammed by the fraudster.

For example, methods exist for detecting malicious programs, which are based on reverse engineering, i.e., on the restoration and verification of the program contained in a card being tested.

However, some of these malicious programs have the ability to "counteract" these reverse engineering-based detection methods, and to thereby appear to be legitimate programs.

Another technique for combating these malicious or corrupted programs may consist in deleting the program contained in a card and in replacing it with a legitimate program.

There again, however, some malicious programs have the ability to behave as if they were actually entirely overwritten by a new program while, in reality, they are still present on the card and ready to be activated.

To date, therefore, no effective method exists for detecting a malicious program on a smart card.

SUMMARY

An aspect of the present disclosure relates to a novel solution, which does not have at least some of these disadvantages of the prior art, and which is in the form of a method for auditing compliance of an electronic platform, referred to as the platform being tested, and/or a computer program being tested, which is present on said platform being tested.

According to an illustrative aspect of the disclosure, a method such as this includes a step for transmitting a single data set, via an auditing device, to said platform being tested, on the one hand, and, on the other hand, to a compliant reference platform present in said auditing device, and a step for determining the compliance of said platform being tested and/or said computer program being tested, based on analysis of the respective behaviors of said platform being tested and said reference platform.

Thus, an aspect of the disclosure enables auditing compliance of a platform being tested and/or a program being tested in a platform being tested, by analyzing its logical and physical behavior and that of a reference platform, under the same test conditions.

In a first phase, the auditing device transmits the same information to both platforms, and follows the behavior thereof according to predetermined criteria (response time, current consumption, electromagnetic radiation, etc.), and, in a second phase, the auditing device determines the compliance of the platform being tested and/or the computer program being tested, based on the analysis of the behaviors of the two platforms during auditing.

In other words, according to an aspect of the disclosure, account is not taken (solely) of the responses (logic processing results) issued by the platforms, but of the behavior or operation thereof, and the interaction thereof with the environment. This approach can be likened to that of a lie detector, which takes account of not only the stated response, but an analysis of the biological behavior and body language of the individual.

According to one advantageous embodiment, said analysis uses a comparison of at least two signals representative of current measurements carried out simultaneously (or sequentially, according to another embodiment) on said platform being tested and said reference platform, respectively.

In fact, one principle of the auditing method according to an aspect of the disclosure is based on the following observation: a platform being tested, or a platform having a program being tested, and a reference platform have comparable "electrical" behaviors when they are subjected to the same operating conditions.

In particular, current consumptions in the two platforms should have comparable variations if the platform being tested is compliant and, conversely, the two platforms will have completely different variations if the platform being tested is not compliant.

Thus, the auditing device carries out current measurements simultaneously on the platform being tested and the reference platform, and then subsequently compares and/or correlates signals representative of these current measurements.

For example, said current measurements are carried out on the respective power supplies of said platform being tested and said reference platform. In fact, the power supply for such platforms is in general easy to access and identify on the electronic circuit, which enables current measurements to be taken at the same locations on both platforms, thereby guaranteeing one of the similarity criteria of the testing conditions for the two platforms.

According to one particular aspect of the disclosure, said comparison includes a correlation between said signals over a predetermined measuring time period.

Thus, the auditing device relies on a correlation between the signals representative of the current measurements in the two platforms in order to issue its compliance decision. This correlation is made over a predetermined time period, which is defined so as to optimize the compliance auditing operation. This time period can likewise be based on a maximum error rate accepted by the method, and/or a maximum time accepted for issuance of the compliance decision.

If enabled by the platform manufacturing technology, the auditing device can also directly compare the signals representative of the current measurements.

However, correlation makes it possible to observe differences in current consumption between a non-compliant platform and a compliant platform, while at the same time taking account of possible differences in current consumption due to the manufacturing process for the platform components, in the case of two compliant platforms. Thus, a strict comparison between signals will show differences in or adequacy of values, whereas correlation will show differences or similarities in the variations, thereby taking account of possible differences in values due to the component manufacturing process.

In particular, said correlation implements at least one of the calculations belonging to the group comprising:
    calculation of temporal correlation;
    calculation of frequency correlation.

Furthermore, according to one particular aspect of the disclosure, said current measurements undergo at least one of the pre-treatments belonging to the group comprising:
    filtering;
    digitization;
    mathematical transformations;
    amplification.

Thus, according to the means implemented in the auditing device, the structure of the measurement signals and the anticipated results in terms of the efficiency of the auditing method, and the current measurements will be adapted prior to being used in a correlation calculation. A complex and specific treatment of these measurements enables improved reliability of the auditing method. This also has the advantage of complicating the task of a counterfeiter who might attempt to make a copy of a platform. This complexity can be increased further by randomly varying certain processing operations (e.g., the points in time or frequencies taken into account).

According to another aspect of the disclosure, the auditing method includes a step for stabilizing the current consumption of said platform being tested and said reference platform, prior to said analysis.

Thus, in order to ensure the validity of the current measurements carried out in each of the platforms, the current consumption is stabilized in each of the platforms, which are thus subsequently found to be in similar physical or electrical states.

In fact, each task carried out by one of the platform components results in a specific current consumption, at the moment the task is executed, and can likewise result in current consumption during execution of the following tasks. It is thus preferable to ensure that the current consumption is stable in each of the platforms prior to carrying out the compliance auditing measurements.

In particular, said stabilization step can include transmission of a series of identical commands to said platform being tested and said reference platform.

The commands can be predefined, and chosen on the basis of their consequences on current consumption in the platforms, or selected randomly.

According to one particular aspect of the disclosure, the method includes a step for deactivating protection against attacks by covert channels, prior to said analysis, said deactivation being dependant on authentication by said auditing device.

In fact, some platforms are protected against attacks by means of current measuring. Such protection, also called a countermeasure, consists in concealing the current consumption of a platform from an "outside observer" by scrambling this consumption or by presenting a chaotic current consumption which is non-representative of the true current consumption in the platform.

In order to be able to base compliance auditing on current measurements, the auditing device is capable of deactivating countermeasures, after being pre-authenticated by the platforms.

Furthermore, according to another particular aspect of the disclosure, during analysis, said platform being tested and said reference platform are subjected to at least one variation of at least one external program parameter belonging to the group comprising:

the supply voltage value;
the type of supply voltage;
the temperature;
the clock frequency;
the clock cycle ratio;
the type of clock.

Thus, one or more variations in external program parameters makes it possible to obtain an improved reliability of the auditing method, because different components react differently to such variations, and render potential copies more complex.

According to one particular aspect of the disclosure, several reference platforms are present in said auditing device, and the auditing method includes a step for selecting the reference platform corresponding to the platform being tested.

According to an alternative aspect of the disclosure, the auditing method includes a step for simultaneous or sequential dynamic loading of at least one test program into said platform being tested and said reference platform, at identical memory locations, and a step for simultaneously or sequentially launching said test program onto said platform being tested and said reference platform.

Thus, the auditing device carries out current measurements while a test program is running, which has been dynamically loaded onto both platforms (tested and reference).

The auditing method can, in particular, include a step for randomly generating said test program, prior to said dynamic loading step.

Thus, the means implemented in the auditing device for carrying out compliance auditing are difficult to anticipate (e.g., for the purpose of manufacturing fraudulent platforms capable of "countering" an auditing method such as this), since the device itself generates a test program that it downloads to each of the platforms before starting the auditing operation. The test program is therefore not known in advance.

In this particular case, said step for generating said test program can take account of at least one rule for confining said random program to a predetermined memory space, prohibiting access to unauthorized memory areas of said platform being tested and said reference platform.

In this way, the auditing device ensures that the program that it is going to generate will not be able to damage the operation of the platforms onto which it is loaded, e.g., by accessing unauthorized memory areas.

The auditing method advantageously includes a step for verifying said random test program by the platform onto which it is downloaded.

Thus, a reference platform (and a platform being tested, respectively) includes means for ensuring that the random test program that it receives is compliant with the operation thereof and, for example, does not accept any instructions accessing unauthorized memory areas.

According to one advantageous embodiment, said auditing device transmits at least one random data item to said test program during said analysis.

In this way, the auditing device remains in communication with each of the platforms as the test program is being run.

According to another aspect of the disclosure, during said analysis, the method includes a step for launching an auditing program which simultaneously or sequentially examines the behavior of a program being tested in said platform being tested, and a corresponding program in said reference platform, known as the reference program.

In this case, the auditing device audits the compliance of a program being tested, in a platform being tested, by comparing the behavior thereof to a reference platform including a reference program. To this end, the auditing device has an auditing program which simultaneously accesses the program being tested and the reference program, and carries out current measurements in the platform being tested and the reference platform, respectively, while the auditing program is running.

Said auditing program preferably includes instructions for handling its own octets and all of the octets of the entire set of memory spaces of the platform being tested and the reference platform, and therefore, in particular, the octets of said program being tested and said reference program, at least some of said handling instructions belonging to the group comprising:

a calculation carried out on the octets;
loading and unloading of octets into/from memory.

In this way, the auditing method analyzes the current measurements of the two platforms, while the auditing program is simultaneously or sequentially accessing all of the octets of the platform being tested and the reference platform, each instruction of the auditing program resulting in a specific platform behavior, in terms of current consumption.

Thus, if the reference program octets and those of the program being tested are different, the auditing method can detect different variations in the current measurements at the moment when the auditing program accesses these different octets, and can thereby assume that the two programs are different.

According to one particular aspect of this alternative, said auditing program is stored in each of said platforms.

For example, the auditing program can form part of the reference program, and presumably form part of the program being tested.

In this case, prior to the step for launching said auditing program, the method includes a step for launching a program including at least one instruction for accessing said program being tested and said reference program, enabling said auditing program to be launched.

This launching step enables the auditing device to configure the reference program and the program being tested in each platform, respectively, so that they execute the program portion thereof which corresponds to the auditing program.

The disclosure likewise relates to a device for auditing the compliance of an electronic platform, known as the platform being tested, and/or a computer program being tested which is present in said platform being tested, according to the method described above.

In particular, a device such as this includes means for debiting a bank card equipped with said platform being tested, which are controlled by said decision-making means. In particular, this may involve a bank card payment terminal capable of auditing the compliance of a bank card or a program present in said card.

The disclosure also relates to computer programs that can be downloaded from at least one communication network and/or recorded on a machine-readable and/or processor-executable medium, including program code instructions for implementing at least some steps of the previously described auditing method.

Finally, the disclosure further relates to an optimized electronic platform capable of being audited according to the above-described auditing method, and including means of amplifying and/or increasing the variations of at least one of the characteristics of said behavior.

The method described above can, of course, apply to any type of platform, without requiring any particular adaptation. However, it is possible to facilitate the auditing operation (by simplifying the auditing devices or associated auditing procedure), or to increase the reliability of this auditing operation by providing for the platforms themselves to be customized during the design and/or production thereof, in order to enhance certain behaviors and to thus facilitate the comparisons.

For example, these customizations can ensure that the current variations are amplified or more rapid.

BRIEF DESCRIPTION OF THE DRAWINGS

Other characteristics and advantages of the disclosure will become more apparent upon reading the following description of one particular embodiment, given as a single illustrative and non-limiting example, and from the appended drawings, in which:

FIGS. 3a and 3b present the various steps implemented according to two alternatives of a first particular aspect of the disclosure;

FIG. 4 presents the various steps implemented according to a second particular embodiment of an aspect of the disclosure.

DETAILED DESCRIPTION OF ILLUSTRATIVE EMBODIMENTS

1. General Aspects

Figure 1:
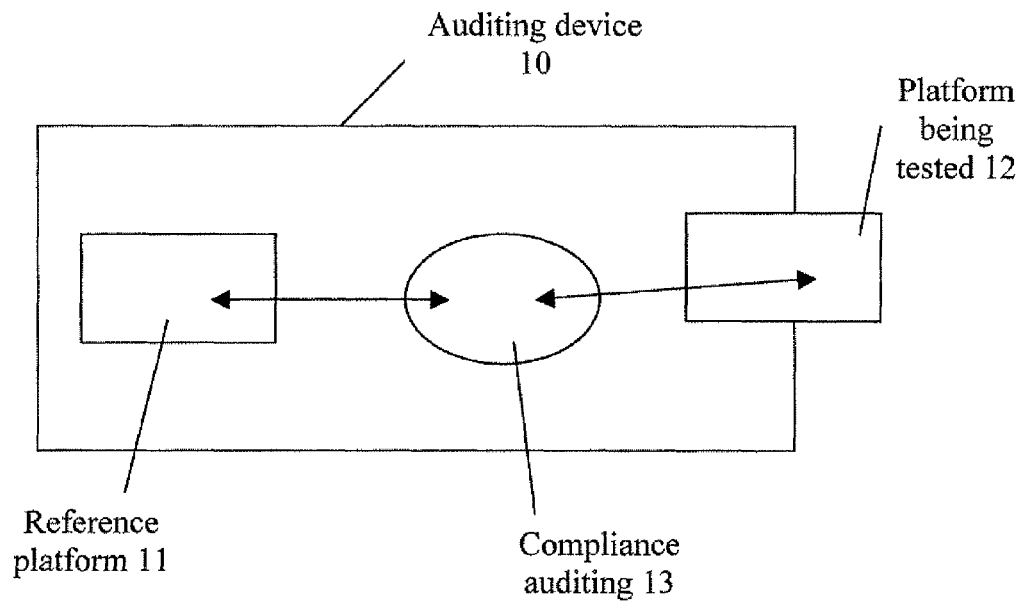
FIG. 1 presents an exemplary auditing device according to one particular aspect of the disclosure.

The basic principle of an illustrative aspect of the disclosure is based on a comparison of the behavior of an electronic platform being tested with that of a compliant reference platform.

In the embodiments described, these examined behaviors correspond to current measurements carried out on operating platforms.

Thus, the compliance auditing method according to an illustrative aspect of the disclosure takes into consideration the current consumption characteristics (or related or similar information, such as response time or emitted radiation) of the electronic circuit present on each platform, under identical conditions, in order to detect a non-compliant platform and/or a non-compliant program present in a platform.

In other words, the auditing method considers the electronic circuit present in a platform to be a "fingerprint" of this platform, while the particular structure thereof ("jungle of transistors") results in a specific behavior, in terms of current consumption, which cannot be reproduced by a fraudulent or counterfeit circuit and/or program, even if the logic result provided is identical.

Two particular embodiments are described herein below:
 compliance auditing of a smart card (in relation to FIGS. 3a and 3b);
 compliance auditing of a program present on a smart card (in relation to FIG. 4).

If applicable, these two embodiments can be combined and implemented by a single auditing device.

Generally speaking, an electronic circuit used in a smart card consists, in particular, of a plurality of interconnected electronic components each having a given behavior for carrying out a given task. These components are integrated in a circuit so as to comply with the anticipated logic behavior for the card.

Next, in order to optimize the size of the component and to increase the efficiency thereof (the smaller a circuit is and the higher its efficiency in terms of manufacturing waste, for example), the circuit is "synthesized," i.e., each component and each connection are optimally positioned on the circuit, while components having the same functions are "factorized," etc., if possible. An optimized circuit is then obtained, which is also referred to as a "netlist" (for "list of interconnections").

A circuit such as this in particular meets the various requirements anticipated for the card, such as its logic behavior, and the size and efficiency of the circuit, and it possesses very specific electrical characteristics, e.g., in terms of current consumption.

Furthermore, one advantage of this optimized circuit lies in the fact that a counterfeiter has great difficulty in reproducing it identically, and in that it is therefore differentiated from a counterfeited circuit by its electrical characteristics, particularly in terms of current consumption.

In fact, the circuit obtained is formed from an assembly of millions of transistors that cannot be directly interpreted by a human, which are combined together in a specific way (some perhaps being useless, others effectively used several times for separate functions).

FIG. 1 shows an exemplary auditing device implementing the method according to an aspect of the disclosure. In this example, the auditing device is a payment terminal 10 used for making payments with smart cards. A terminal 10 such as this contains a reference smart card 11 and outside access for a smart card being tested 12. The terminal 10 includes means for implementing the compliance auditing method 13 according to an aspect of the disclosure.

In the case where the terminal can be summoned to audit cards issued by several manufacturers, it may comprise several reference smart cards, corresponding, respectively, to the various types of cards with which it agrees to conduct transactions.

In fact, a payment terminal is generally capable of conducting transactions with several types of smart cards, corresponding, for example, to different banking institutions, and comprising different electronic circuits.

In this way, a payment terminal can be summoned to audit the compliance of different types of smart cards, and thus be summoned to compare the cards being tested with several reference cards. Since each type of card has a specific behavior, the auditing device or terminal implements a step for identifying the type of card being tested (or the alleged type, if a non-compliant card is involved) and accordingly selects the reference card.

Considered herein below is the specific case wherein the terminal is specifically dedicated to one type of card and audits the compliance of a card being tested by comparing it to a single reference card. Therefore, it involves detecting a card being tested which would appear to have a correct logic behavior, but the composition of which, made up of a transistor structure, would appear to be different.

Figure 2:
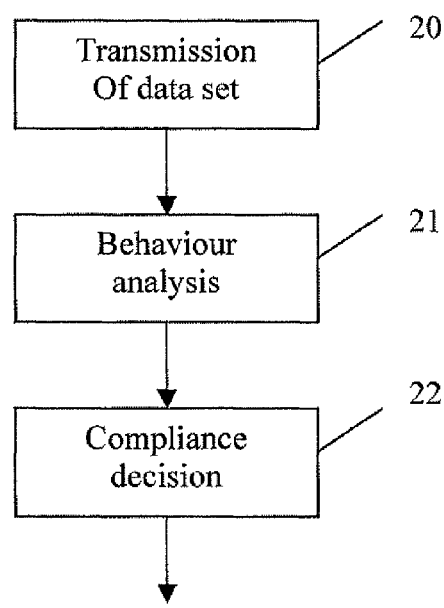
FIG. 2 is a simplified flowchart showing the basic principle of an aspect of the disclosure.

The method comprises three main steps, as shown in FIG. 2.

A first step 20 for transmitting a set of data enables the auditing device to indicate to the reference and test cards that they are going to enter into a specific operating mode, referred to as the test mode, which is different from the usual operating mode of the cards, e.g., the one enabling transactions to be conducted.

This test mode enables the device to audit the conformity of a card being tested by implementing the auditing method.

The information transmitted in this first step 20, for example, consists of a command requesting the cards to begin "listening" to the auditing device. Upon receiving this command, the cards go into test mode and await other information coming from the auditing device.

The set of data transmitted may also include commands required for preparing the cards prior to subsequent behavior analysis 21 and compliance decision 22 steps.

In fact, the auditing method may comprise a few steps prior to the auditing operation itself, which are necessary to the efficiency thereof, and which, in particular, make it possible to not cause damage to the smart cards concerned (the one being tested and the reference one(s)).

These steps will be presented later on, in relation to FIGS. 3a, 3b and 4.

After the step 20 for transmitting a set of data, the cards being tested and reference cards are in the same testing state. The next step is a step for analyzing 21 the behaviors of the two cards, with a view to a compliance decision step 22, during which the device validates or invalidates the compliance of the card being tested.

These two steps 21 and 22 are also explained in detail later on, in relation to FIGS. 3a, 3b and 4.

The pre-compliance auditing steps will now be described in relation to FIGS. 3a, 3b and 4.

A first pre-auditing step is a step (31a, 31b, 41) for deactivating countermeasures.

A smart card can indeed be protected against a specific form of attack, referred to as a "countermeasure attack" or "covert channel attack". One of these safeguards is called a "countermeasure," and can be seen as a current "scrambler," i.e., a method enabling the consumption of the card during the operation thereof to be concealed from a current analyzer, or to present a chaotic current consumption of the card during the operation thereof.

Safeguards such as this can be deactivated when the method is implemented, said method being based on current measurements in the cards being tested and reference cards.

However, in order to prevent any unauthorized deactivation of the countermeasures, said deactivation must be conditional upon authentication of the device, in this case the payment terminal requesting it.

This authentication can implement authentication methods well-known to those skilled in the art, such as cryptographic methods, and are therefore not listed herein.

Thus, once the terminal is authenticated as being qualified to deactivate the countermeasures, it can begin the compliance audit according to an aspect of the disclosure.

A second pre-auditing step can be a step (32a, 32b, 42) for stabilizing the current in the cards.

In fact, in order to ensure a good degree of efficiency of the current measurements carried out, it is desirable for the current consumption in the cards to be pre-stabilized, so as to not take account of variations due to previous card activity.

In fact, the current consumption in a smart card, at an instant t, depends upon the task carried out by the electronic circuit at the instant t and upon the previous tasks. For example, a task carried out at the instant t-1 can result in capacitor discharges at the instant t.

The current stabilization step of the method consists in simultaneously transmitting to each of the cards (reference and tested) a certain number of predetermined, typically identical commands enabling both cards to be placed in the same current consumption state.

These commands may be prompts sent to the cards causing specific actions therein, or even responses from the cards.

Once the current consumption has been stabilized in the cards, the device begins the compliance audit, because both cards are presumed to be in the same "physical" state.

Figure 3B:
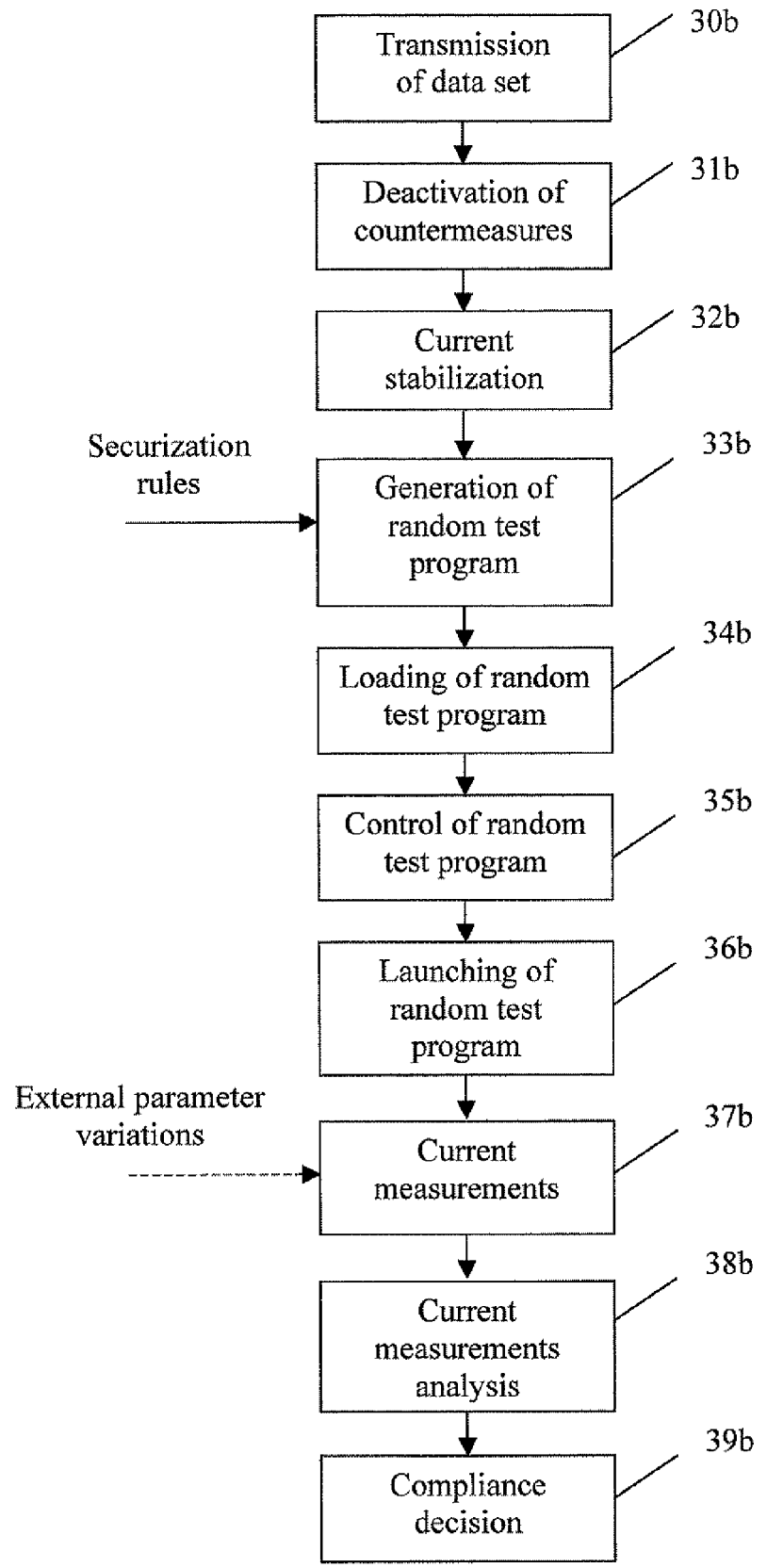

A first particular embodiment of the disclosure will now be presented in relation to FIGS. 3a and 3b, wherein the auditing method is implemented in a payment terminal to audit the compliance of a smart card.

2. Detection of a Cloned Card 2.1 First Alternative

According to a first alternative, shown in FIG. 3a, the behavior analysis step 21 (FIG. 2) consists in measuring the current consumption in each of the two cards and in making a correlation between these measurements over a predetermined period of time.

In this alternative, the data set transmission 30a, countermeasure deactivation 31a and current stabilization 32a steps are the same as those described previously.

In this alternative, the behavior analysis step 21 includes the steps for measuring currents 33a and for analyzing 34a these measurements.

More precisely, the terminal interacts simultaneously with each of the two cards, e.g., by transmitting information, commands, or simply random data to both cards, and measures the current in each of the cards during a current measurement step 33a, so as to have a series of measurements and a current consumption curve for each of the cards.

According to another embodiment, these identical dialogs can be carried out sequentially (or alternately) in the reference platform, and then in the platform being tested. More generally speaking, the various aspects of the disclosure can be implemented simultaneously in both platforms, or sequentially, insofar as the external conditions remain constant.

These current measurements are carried out at the same location on each card, e.g., near their respective power supplies, so as to be able to be compared efficiently.

Once these current measurements have been carried out, the terminal thus has a series of current measurements, or a current curve, each corresponding to the consumption of the card under the same test conditions. It is indeed important to note that, according to an aspect of the disclosure, it is not sought to verify, absolutely and in a specific situation, whether the card does indeed have a current value which can be imitated or simulated by a cleverly produced fake card. It is verified, however, in a predetermined or random manner, whether the behavior is that expected at the moment of testing, under the test conditions, and, if applicable, in response to prompts and/or variable conditions.

The next step 34a for current measurement analysis, which is carried out at the same time for the card being tested and the reference card, thus ensures comparison of the electrical behaviors of each card under the same test conditions.

This step 34a, for example, can immediately take account of the current measurements for each card and correlate them, i.e., compare the values and/or evolutions thereof. In some cases, this may involve comparisons, in the strict sense of the word, which have a predetermined tolerance limit. In order to prevent decision errors due, for example, to variations in external conditions in comparison with pre-calibrated values, or to differences in consumption due to the manufacturing process, it may be preferable for the comparison to use a correlation between the measurements. In particular, this correlation can be temporal and/or frequency-based (after the measured signal has been converted by an FFT), and may involve the current measurements themselves or signals representative of these measurements, or even any mathematical function of a physical signal or timing information resulting from the behavior of each card.

In fact, the terminal can implement pre-correlation processing of the current measurements taken, in order to obtain better results in terms of efficiency and/or in order to yet further complicate simulation by a non-compliant card or program.

Thus, the current measurements can be filtered, digitized, amplified and/or undergo mathematical transformations prior to being correlated.

For example, the terminal can apply a Fourier transform to the current measurements and thereby obtain two signal curves representative of the current measurements for each card, so as to be able to compare the amplitude variations of each curve at various frequencies.

If the current measurement curves, or the signal curves representative of the current measurements which are obtained after processing of the current measurements, evolve in a substantially identical manner (with tolerance limits that are set, in particular, according to the technologies used) over the predetermined time period, the terminal will decide that the card being tested is a valid card and issue a positive compliance decision, during the compliance decision step 25*a*.

In fact, two cards comprising two identical optimized electronic circuits will have an identical behavior in terms of current consumption.

On the other hand, two cards comprising two different optimized electronic circuits will behave differently in terms of current consumption, even if the programmed logic behaviors are the same, because the same command sent to each card will not implement the same components of the optimized electronic circuits and will result in different current consumptions for each card.

In order to obtain better performance, the current measurements can be subjected to variations (predetermined or random) in external parameters, such as the supply voltage, temperature or clock (clock frequency, clock cycle ratio, type of clock, etc.).

Such variations will indeed have an effect on the current variations of the two cards but, if the optimized electronic circuits are identical on both cards, the influence of these external parameter variations will be the same, because it will depend upon the components themselves and upon the arrangement thereof on the circuit. On the other hand, if the optimized circuits are different, these variations will not have the same impact on the current measurements of the two cards.

2.2 Second Alternative

According to a second alternative, shown in FIG. 3*b*, the current measurements are not carried out during a predetermined period of interaction between the terminal and the cards, but during a predetermined run time for a test program that has been pre-loaded into each of the cards.

The data set transmission 30*b*, countermeasure deactivation 31*b* and current stabilization 32*b* steps have already been described previously, specifically in the description of the first alternative of the first particular embodiment.

However, the data set transmission step 30*b*, for example, can also include the transmission of data informing the cards that they are going to receive a test program that they will subsequently have to run.

According to a first example, a test program such as this, can be known by and contained in the terminal, or, according to a second example, randomly and dynamically generated by the terminal at the moment the auditing method is implemented.

In this second example, the terminal thus randomly generates a test program during a generation step 33*b*. This random program is intended to be loaded into both the card being tested and the reference card, during a loading step 34*b*.

A test program such as this comprises instructions which will then be executed by the cards during a test program launching step 36*b*.

Running a program such as this on the cards in particular enables the actions performed by the cards to be automated during the current measurement period, by replacing the interaction step as described above in the first alternative.

However, precautions can be taken with respect to this test program, so that it does not cause degradations in the operation or security of the cards onto which it is downloaded.

In fact, the auditing method can ensure that the test program used does not access unauthorized areas in the card memories, does not alter the behavior of the cards and does not destroy the content of the cards.

To that end, the described method provides for the implementation of securitization rules during the step for random generation 33*b* of the test program.

Thus, the test program is generated so as to take account of predetermined criteria, e.g., addresses of unauthorized memory areas of the cards. The test program generated, for example, can be restricted in size, and/or contain a predetermined and reserved load address in the cards, so that the test program is confined to a reserved memory space in the card memory.

Another means of verifying the test program can be implemented in the cards themselves, after the loading thereof, during a verification step 35*b*. This solution thus enables the cards themselves to verify for example that the test program does not contain any dynamic instructions enabling access to the unauthorized memory areas. This verification can also detect from the moment of downloading an unauthorized address or a program of non-standard size.

Alternatively, the random test program can contain a signature, or a "MAC" (Message Authentication Code), which the card into which it is downloaded verifies. In this case, the auditing device is presumed to be trustworthy.

As soon as this random test verification step is complete, the terminal can transmit a program launching command to each of the cards, and define the beginning and the end of the current measurement period, with relation to the running of the test program. This launching operation can also be performed by the cards themselves.

Thus, the current measurements carried out in each of the two cards during step 37*b* are based on the test program instructions. For example, the two following cases are observed:

the case where the card being tested is compliant and comprises the same optimized electronic circuit as the reference card: the test program instructions have the same effects on the various components of the two cards and the current measurements are correlated;

the case where the card being tested is not compliant and does not comprise the same optimized electronic circuit as the reference card: the test program instructions do not have the same effects because the components of the two cards are different and/or positioned at different locations on the cards, and the current measurements are decorrelated.

These current measurement 37*b*, current measurement analysis 38*b* and compliance decision 39*b* steps can be the same as those described in the first alternative of this embodiment (FIG. 3*a*), and are therefore not described again.

Furthermore, the current measurements can also depend upon variations in external parameters, such as the supply voltage, temperature or clock, as already described in relation to FIG. 3a.

As already mentioned, these variations can be amplified and enhanced by customizing the design and/or production of the platforms.

3. Detection of a Non-Compliant Program

A second particular embodiment of the disclosure will now be presented in relation to FIG. 4, in which the auditing method is implemented in a payment terminal in order to audit the compliance of a program present on a smart card.

The particular embodiment in particular enables the auditing device, e.g., a payment terminal, to ensure that the program being tested, which is contained on a smart card, is compliant with an anticipated reference program and does not comprise "malicious" instructions.

Malicious instructions such as this, for example, can enable a fraudulent card to access secrets contained on the card for the purpose of duplicating it, to conduct unauthorized transactions with the card, etc.

In this particular embodiment, the countermeasure deactivation 41, current stabilization 42, current measurement 44, current measurement analysis 45 and compliance decision 46 steps 41 can be similar to those described in the preceding particular embodiment.

The data set transmission step 40 consists, in particular, in informing the card being tested and the reference card that they are going to enter into a mode for testing the programs present in each of them, i.e., the program being tested (on the card being tested) and the reference program (on the reference card). The cards thus begin listening to the auditing device in a test mode and not in a normal operating mode.

Once the countermeasure deactivation 41 and current stabilization 42 steps (already described previously) have been carried out, the auditing device runs an auditing program during a launching step 43, while simultaneously accessing the program being tested and the reference program.

The current measurements (step 44) are carried out during a predetermined time period for running the auditing program.

In fact, an auditing program such as this includes instructions making it possible to handle its own octets and all of the program octets contained in the platform being tested and in the reference platform, and if the two programs are identical. Handling of the octets should have the same effect on the current consumption in both cards, because this handling of the octets results in tasks carried out by the various components of the electronic circuits of the cards.

Thus, if the programs (tested and reference) are identical, the current measurements of the two cards are correlated, otherwise they differ from one another.

The current measurement analysis 45 and compliance decision 46 steps are the same as those described for the first particular embodiment.

According to a first alternative of this second particular embodiment, the auditing program is present in the terminal implementing the auditing method.

Thus, the launching step 43 corresponds to running a program in the terminal, which simultaneously accesses its own octets and those of the tested and reference programs, respectively.

According to a second alternative, the auditing program is contained in the reference program (the operating program of the card) and is therefore presumed to also be contained in the program being tested.

In this case, the launching step 43 corresponds to the issuing of a command, from the terminal to the cards, for launching the internal auditing programs thereof. Thus, upon receiving this command, a reference program present on a card runs its auditing portion, which, as in the first alternative, contains instructions for handling its own octets and the remainder of the program octets present on the card.

The current measurements are carried out while this auditing program is running, and several different cases can be identified:

- the case where the program being tested is a compliant program and therefore contains an auditing program: the auditing programs are run on both cards and the current measurements of the cards being tested and reference cards are correlated;
- the case where the program being tested is not a compliant program but still contains an auditing program: the auditing programs are run on both cards but the current measurements of the two cards are decorrelated, particularly when the auditing program must handle malicious octets from the program being tested;
- the case where the program being tested is not a compliant program and does not contain any auditing program: the auditing program is launched on the reference card only and the current measurements of the two cards are decorrelated.

4. Improvements and Alternatives

The embodiments described above introduce the implementation of smart cards for banking purposes in particular. However, one or more aspects of the disclosure can also be implemented in numerous other applications, to the extent that it is necessary to authenticate the origin and/or compliance of a card and/or a program present thereon.

Furthermore, the disclosure is not limited to smart cards but, on the contrary, can be implemented on other types of electronic platforms, to the extent that it is necessary to validate the origin and compliance thereof. For example, according to the disclosure, it is possible to verify RFID elements. In this case, the comparison of behaviors may take account of the electromagnetic radiation from a reference RFID element and from an RFID element being tested, by using an approach similar to that described previously.

An aspect of the present disclosure therefore relates to simply and efficiently detecting a cloned card object.

Another aspect of the present disclosure relates to simply and efficiently detecting a corrupted or malicious program on a smart card.

In particular, an exemplary aspect of the present disclosure provides such a technique having improved performance in terms of the efficiency of detecting cloned smart cards and/or malicious program objects, in terms of the resources used to carry out such detection operations, and in terms of the time required for such detection operations.

Thus, one aspect of the present disclosure provides a technique such as this, which can be implemented in a terminal at reduced cost, and which enables auditing within a few seconds.

Although the present disclosure has been described with reference to one or more examples, workers skilled in the art will recognize that changes may be made in form and detail without departing from the scope of the disclosure and/or the appended claims.

What is claimed is:

1. Method for auditing compliance of at least one of an electronic platform, referred to as a platform being tested or a computer program being tested, which is present on said platform being tested, wherein the method comprises:

transmitting the same data set, via an auditing device, to said platform being tested, and to a compliant reference platform present in said auditing device, deciding upon compliance of at least one of said platform being tested or said computer program being tested, based on an analysis of respective behaviours of said platform being tested and said reference platform, said analysis using a comparison of at least two signals representative of current measurements carried out simultaneously or sequentially on respective power supplies of said platform being tested and said reference platform, said comparison including a correlation between said signals over a predetermined measurement period, said predetermined measurement period including at least two successive current measurements being performed on the same location of said platform being tested and two successive current measurements being performed on the same location of said reference platform, and issuing a compliance decision by the auditing device.

2. Auditing method of claim 1, wherein said correlation implements at least one of the calculations belonging to the group comprising:
a temporal correlation calculation;
a frequency correlation calculation.

3. Auditing method of claim 1, wherein said current measurements undergo at least one of the preprocessing operations belonging to the group comprising:
filtering;
digitization;
mathematical transformations;
amplification.

4. Auditing method of claim 1, wherein the method includes stabilizing the current consumption of said platform being tested and said reference platform, prior to said analysis.

5. Auditing method of claim 4, wherein said stabilization step includes transmission of a series of identical commands, simultaneously to said platform being tested and said reference platform.

6. Auditing method of claim 1, wherein the method includes deactivating a safeguard against attacks by covert channels, prior to said analysis, said deactivation being conditional upon authentication of said auditing device.

7. Auditing method of claim 1, wherein, during said analysis, said platform being tested and said reference platform are subjected to at least one variation of at least one external parameter belonging to the group comprising:
the supply voltage value;
the type of supply voltage;
the temperature;
the clock frequency;
the clock cycle ratio;
the type of clock.

8. Auditing method of claim 1, wherein several reference platforms are present in said auditing device, and the method includes selecting said reference platform corresponding to the platform being tested.

9. Auditing method of claim 1, wherein, during said analysis, the method includes the following steps:
simultaneous or sequential dynamic loading of at least one test program into said platform being tested and said reference platform, at identical memory locations; and
simultaneously or sequentially launching said test program into said platform being tested and said reference platform.

10. Auditing method of claim 9, wherein the method includes randomly generating said test program, prior to said dynamic loading step.

11. Auditing method of claim 10, wherein said step of generating said test program takes account of at least one rule for confining said random test program to a predetermined memory space, prohibiting access to unauthorized memory areas of said platform being tested and said reference platform.

12. Auditing method of claim 10, wherein the method includes verifying said random test program by the platform onto which the random test program is downloaded.

13. Auditing method of claim 9, wherein said auditing device transmits at least one random data item to said test program during said analysis.

14. Auditing method of claim 1, wherein, during said analysis, the method includes launching an auditing program which simultaneously or sequentially accesses a program being tested in said platform being tested, and a corresponding program in said reference platform, known as a reference program.

15. Auditing method of claim 14, wherein said auditing program includes instructions for handling the auditing program's own octets and all of the octets of the entire set of memory spaces of the platform being tested and the reference platform, respectively, at least some of said handling instructions belonging to the group comprising:
a calculation carried out on the octets;
loading and unloading of octets into/from memory.

16. Auditing method of claim 14, wherein said auditing program is stored in each of said platforms.

17. Auditing method of claim 16, wherein, prior to the step for launching said auditing program, the method includes launching a program including at least one instruction for accessing said program being tested and said reference program, enabling said auditing program to be launched.

18. Device for auditing compliance of an electronic platform, known as a platform being tested, and/or a computer program being tested which is present in said platform being tested, wherein the device includes:
means for transmitting a single data set to said platform being tested and to a compliant reference platform present in said auditing device, and
means for determining compliance of at least one of said platform being tested or said computer program being tested, based on analysis of respective behaviours of said platform being tested and said reference platform, said analysis using a comparison of at least two signals representative of current measurements carried out simultaneously or sequentially on respective power supplies of said platform being tested and said reference platform, said comparison including a correlation between said signals over a predetermined measurement period, said predetermined measurement period including at least two successive current measurements being performed on the same location of said platform being tested and two successive current measurements being performed on the same location of said reference platform.

19. Auditing device of claim 18, wherein the device includes means for debiting a bank card equipped with said platform being tested, which are controlled by said means for determining.

20. A non-transitory computer readable storage medium comprising an auditing computer program stored thereon, the auditing program comprising program code instructions for carrying out a method when executed by a processor for auditing compliance of at least one of an electronic platform, referred to as a platform being tested or a computer program being tested, which is present on said platform being tested, wherein the method comprises:

transmitting a same data set, via an auditing device, to said platform being tested and to a compliant reference platform present in said auditing device, deciding upon compliance of at least one of said platform being tested or said computer program being tested, based on an analysis of respective behaviours of said platform being tested and said reference platform, said analysis using a comparison of at least two signals representative of current measurements carried out simultaneously or sequentially on respective power supplies of said platform being tested and said reference platform, said comparison including a correlation between said signals over a predetermined measurement period, said predetermined measurement period including at least two successive current measurements being performed on the same location of said platform being tested and two successive current measurements being performed on the same location of said reference platform, and issuing a compliance decision by the auditing device.

21. An electronic platform receiving data from an auditing device according to an auditing method for auditing compliance of at least one of the electronic platform, referred to as a platform being tested or a computer program being tested, which is present on said platform being tested, wherein the method comprises:

transmitting a same data set, via an auditing device, to said platform being tested and to a compliant reference platform present in said auditing device, deciding upon compliance of at least one of said platform being tested or said computer program being tested, based on an analysis of respective behaviours of said platform being tested and said reference platform, said analysis using a comparison of at least two signals representative of current measurements carried out simultaneously or sequentially on respective power supplies of said platform being tested and said reference platform, said comparison including a correlation between said signals over a predetermined measurement period, said predetermined measurement period including at least two successive current measurements being performed on the same location of said platform being tested and two successive current measurements being performed on the same location of said reference platform, and issuing a compliance decision by the auditing device, wherein the platform includes means of amplifying and/or increasing variations of at least one characteristic of said behaviour.

* * * * *